(No Model.) 6 Sheets—Sheet 2.

W. S. SHIRK.
TYPE WRITING MACHINE.

No. 588,608. Patented Aug. 24, 1897.

Witnesses
Jas. K. McCathran

By his Attorneys, William S. Shirk
C. A. Snow & Co.

(No Model.) 6 Sheets—Sheet 3.

W. S. SHIRK.
TYPE WRITING MACHINE.

No. 588,608. Patented Aug. 24, 1897.

Fig. 3.

Witnesses
Jas H. McCuthran

Inventor
William S. Shirk
By his Attorneys.
C. A. Snow & Co.

THE NORRIS PETERS CO., PHOTO-LITHO., WASHINGTON, D. C.

(No Model.) 6 Sheets—Sheet 4.

W. S. SHIRK.
TYPE WRITING MACHINE.

No. 588,608. Patented Aug. 24, 1897.

Witnesses
Jas. K. McCathran

Inventor
William S. Shirk
By his Attorneys,
C. A. Snow & Co.

(No Model.)

W. S. SHIRK.
TYPE WRITING MACHINE.

No. 588,608. Patented Aug. 24, 1897.

Witnesses
Jas. K. McCathran

Inventor
William S. Shirk
By his Attorneys,
C. A. Snow & Co.

UNITED STATES PATENT OFFICE.

WILLIAM S. SHIRK, OF ANDERSON, INDIANA.

TYPE-WRITING MACHINE.

SPECIFICATION forming part of Letters Patent No. 588,608, dated August 24, 1897.

Application filed August 15, 1896. Serial No. 602,879. (No model.)

*To all whom it may concern:*

Be it known that I, WILLIAM S. SHIRK, a citizen of the United States, residing at Anderson, in the county of Madison and State of Indiana, have invented a new and useful Type-Writing Machine, of which the following is a specification.

My invention relates to type-writing machines, and has for its object to provide a compact, efficient, and comparatively inexpensive mechanism of that class wherein the type are carried by a type-wheel or its equivalent, which is adjusted to bring the proper type-face into the printing-plane in order to secure the impression of the proper character.

Further objects and advantages of this invention will appear in the following description, and the novel features thereof will be particularly pointed out in the appended claims.

In the drawings.

Similar numerals of reference indicate corresponding parts in all the figures of the drawings.

Figures 6, 7:
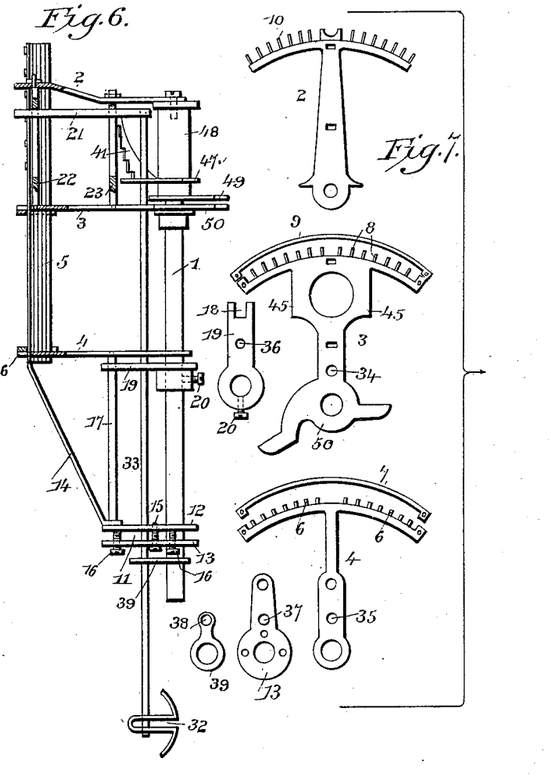
Fig. 6 is a vertical central section of the same.
Fig. 7 is a detail view of the parts of the type-wheel disassembled.
Figures 8, 9, 10, 11:
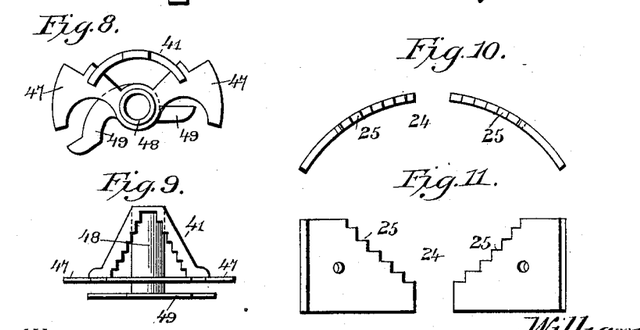
Fig. 8 is a detail plan view of the operating-gage and the frame by which it is carried.
Fig. 9 is a front view of the same.
Fig. 10 is a plan view of the fixed gage.
Fig. 11 is a rear view of the same.
Figures 12, 13:
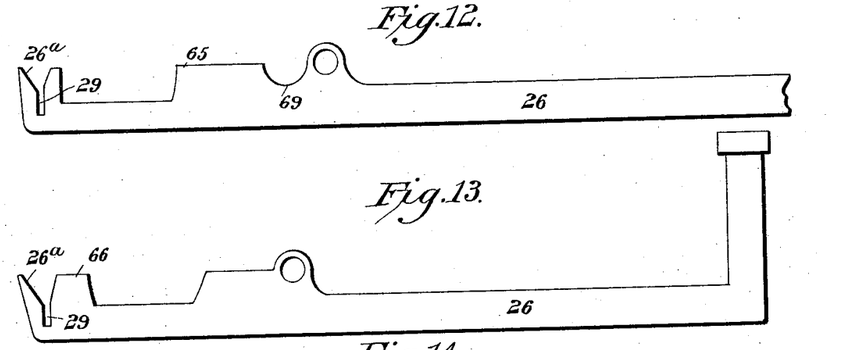
Figs. 12 and 13 are detail side views of key-levers of different lengths.
Figure 14:
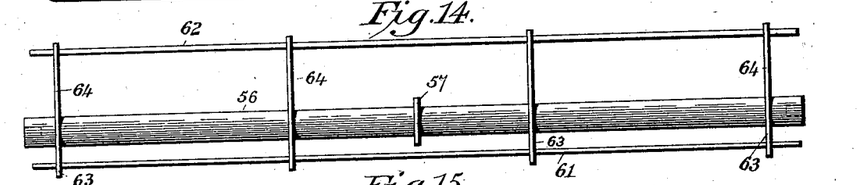
Fig. 14 is a detached plan view of the rocker by which the vertical position of the type-wheel is adjusted to bring different horizontal lines of type-faces belonging to the same group or "case" into the printing-plane.
Figure 15:
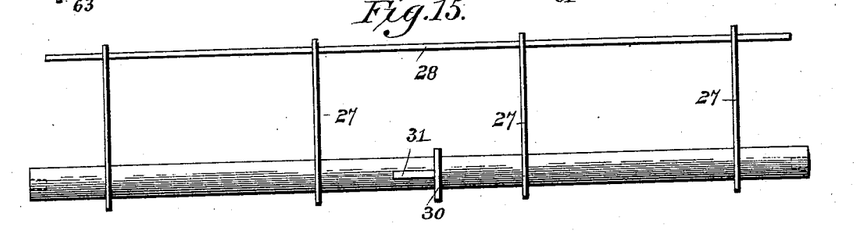
Fig. 15 is a detail rear view of a rocker forming one member of the means for regulating the lateral throw of the type-wheel to bring the type-faces carried by different yielding tongues into the printing-plane.
Figures 16, 19:
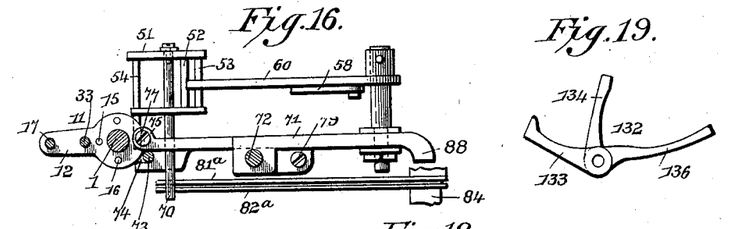
Fig. 16 is a detail plan view of the case-shifting block, together with the trip and contiguous parts employed for varying the positions of the type-wheel to bring different horizontal lines of type-faces into the printing-plane.
Fig. 19 is a detail view of the operating-pawl.

The type-wheel which I have illustrated in connection with my improved form of type-writing machine is mounted for lateral or rotary and vertical or longitudinal adjustment upon a guide and pivot rod 1, the frame of said wheel consisting of horizontal forwardly-extending upper, intermediate, and lower arms 2, 3, and 4, respectively, provided at their front ends with segmental or arc-shaped cross-heads which carry the type-bearing tongues 5. The tongues are provided at their lower extremities with perforations fitted over retaining-pins 6 on the cross-head of the lower arm 4 and held in place by means of a securing-strip 7, (shown in detail in Fig. 7,) and the upper portions of the tongues extend through guides formed on the cross-heads of the upper and intermediate arms 2 and 3, said upper and intermediate arms being secured to the spindle 1 and capable of rotary movement therewith. The intermediate cross-head is provided with spaced pins 8 and a holding or guide strip 9, whereby the tongues are adapted to move longitudinally thereto, and the upper cross-head is provided with radial guide-pins 10, which are of a length in excess of the throw of the tongues in operation, the tendency of the tongues being to normally press against the outer edge of the cross-head or the floors of the seats which are provided upon said cross-head. Also mounted to slide upon the spindle 1 is a shoe 11, consisting of upper and lower plates 12 and 13, the former being terminally connected by means of an inclined brace 14 with the outer extremity of the lower arm 4, which forms the movable tongue-carrying arm of the type-wheel. The lower plate 13 is adjustably connected to the upper plate 12 by means of adjusting-screws 15, which extend through the lower plate and are threaded in the upper plate, and set-screws 16, which are threaded in the lower plate and bear their extremities against the upper plate, for a purpose hereinafter explained. In order to stiffen the type-wheel, a vertical brace-bar 17 is arranged between the upper shoe-plate 12 and the arm 4, and in order to prevent said wheel from turning independently of the spindle 1 said brace-bar is extended through a notch 18 in the free end of a guide-arm 19, which is fixed by means of a set-screw 20 to the spindle, whereby said bar 17 performs the additional function of a guide.

In order to bring the type-faces carried by different tongues into the vertical plane of the printing-point, I employ a gage or limiting bar 21, which is mounted for vertical movement upon the type-wheel in slotted guide-bars 22 and 23, which are arranged vertically between and connecting the upper and intermediate arms 2 and 3, respectively, at the outer ends and at intermediate points thereof, and a coöperating stepped gage 24, which is fixed in position concentric with the spindle 1 between the planes of said upper and intermediate arms 2 and 3, and contiguous to the rear sides of the type-carrying tongues. This gage consists of opposite duplicate right and left hand series of steps or shoulders 25, said series diverging toward their upper ends, and inasmuch as the gage-bar 21 operates between these series of steps or shoulders it will be understood that the lateral adjustment or swinging movement of the type-wheel will be regulated by the vertical position of the gage-bar. For instance, if the gage-bar is at the upper limit of its movement it will be in the plane of the uppermost steps or shoulders of the gage, and hence the type-wheel will be free to rotate in either direction a distance sufficient to bring either of the outside tongues into the printing-plane, whereas if the gage-bar is depressed to the lower limit of its movement it will be in the plane of the lowermost shoulders or steps of the fixed gage, and hence the type-wheel will be capable of a movement in either direction only sufficient to bring one of the innermost tongues into the printing-plane. In the same way, by arranging the gage-bar at different elevations, any desired tongue upon either side of the type-wheel may be brought positively into the printing-plane.

Figures 1, 4:
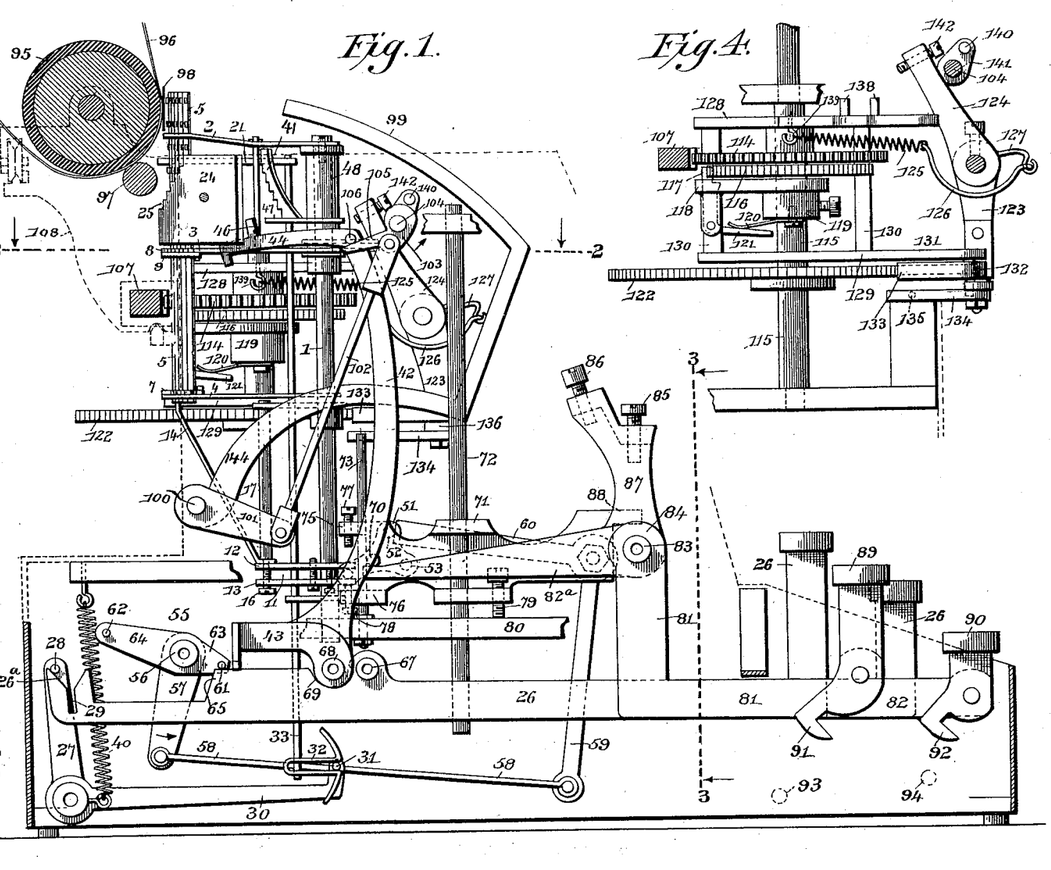
Figure 1 is a side view of a type-writing machine constructed in accordance with my invention with the contiguous side wall of the casing omitted.
Fig. 4 is a detail view of the paper-carriage-feed mechanism, the contiguous portions of the mechanism being shown in section upon a plane indicated by the line 4 4 of Figs. 2 and 3.

Between the key-levers 26 and the gage-bar I have arranged connections by which vertical movement is imparted to said bar, the extent of such vertical movement being regulated by the characters carried by the respective keys, whereby when a given key is operated the gage-bar will be depressed to such a point that when the type-wheel is turned and is checked in its rotary or lateral movement the type-carrying tongue bearing the type corresponding with the character carried by said key will be arranged in the printing-plane. In the construction illustrated in the drawings said connections include a rocking frame having arms 27, carrying a transverse rod 28, which is arranged in the paths of cam-surfaces $26^a$ on the rear extremities of key-levers, whereby when a key-lever is depressed at its free end its cam-bearing rear end is elevated to bring its cam-face into contact with said rod 28, and thereby swing the frame forward, said cam-face communicating with a vertical slot or parallel-sided seat 29, into which the rod is received at an intermediate point of the throw of the lever, and in which it remains until said lever is fully depressed. The shaft of this rocking frame also carries a forwardly-extending arm 30, having a terminal pin 31, which operates in a bifurcated link 32 at the lower extremity of a vertical operating-rod 33, which is attached at its upper extremity to the gage-bar. This connecting-rod extends through guide-perforations 34 and 35 in the arms 3 and 4, respectively, and similar perforations 36 in the guide-arm 19, 37 in the upper and lower shoe-plates 12 and 13, and 38 in a short guide-arm 39, which is fixed to the spindle. A return-spring 40 is employed to return the rocking frame to its normal position and the gage-bar to the limit of its upward movement, as illustrated in Fig. 1.

The means for imparting rotary or lateral movement to the type-wheel includes an operating-gage 41, which is constructed and arranged reversely to the fixed gage and is stepped or shouldered to coöperate with the gage-bar in a manner similar to said fixed gage. This operating or movable gage is also provided with oppositely-arranged or right and left hand series of steps or shoulders corresponding in number with the tongues upon each side of the center of the type-wheel and mounted coaxially with the type-wheel. Hence rotary motion imparted to the operating-gage is communicated through the gage-bar to the type-wheel and is limited by the fixed gage, but inasmuch as it is desirable, for a reason hereinafter explained, to move the operating-gage through a given arc irrespective of the tongue which is to be brought into the printing-plane, the construction is such that said operating-gage moves through an arc of greater or less extent, according to the vertical position of the gage-bar before a shoulder or step thereof engages said gage-bar. For instance, if the gage-bar is in its uppermost position and rotary motion is imparted to the operating-gage the latter will swing through an arc equal to one-half the interval between the innermost tongues of the type-wheel and will then engage the gage-bar and swing the latter through an arc approximately equal to one-half the width of the type-wheel to bring the outermost type-bearing tongue into the printing-plane, whereas if the gage-bar is depressed to its lowermost position and motion is imparted to the operating-gage the latter will swing through an arc approximately equal to one-half the width of the gage before the lowermost shoulder or step upon one side thereof will be brought into engagement with the gage-bar, after which the movement of the operating-gage will be only sufficient to bring one of the innermost tongues of the type-wheel into the printing-plane. This compensation in operation is due to the respectively inverted positions of the stepped gages, the fixed gage having its series of steps or shoulders arranged to diverge upwardly, while the series of steps or shoulders on the operating-gage are arranged to diverge downwardly. In other words, said gages have their series of steps or shoulders arranged, respectively, to converge and diverge in a common direction.

The means which I have provided for imparting rotary motion to the operating-gage include a driving-lever 42, which is provided with a short arm 43, arranged in the paths of the key-levers in rear of their fulcrum-points, whereby when a key-lever is depressed at its front end the rearwardly-extending arm 43 is elevated to throw the long arm of the driving-lever forwardly, and said long arm terminates in a head 44, which curves inwardly toward and is normally arranged at its extremity contiguous to a shoulder 45 on the intermediate arm of the type-wheel. Inasmuch as the driving-lever is duplicated upon the opposite side of the plane of the center of the machine it will be understood that when said levers are in their normal positions the type-wheel is locked in its central or normal position and cannot be moved laterally until after the removal of one of the driving-levers from the path thereof. The head of the driving-lever is also provided with an upwardly-extending stud 46, which is adapted to engage one of the lateral arms 47 of the operating-gage, and inasmuch as the throw or depression of all of the key-levers is uniform it will be seen that the movement of the driving-lever will also be the same for all of the keys, and hence the movement of the operating-gage will be uniform, as above mentioned, irrespective of the amount of angular movement imparted to the type-wheel. Also carried by the hub or sleeve 48 of the operating-gage 41 is a spider 49, and located upon the spindle 1, directly beneath said spider, is a secondary spider 50, corresponding in shape with the gage-spider 49 and adapted to be operated simultaneously therewith, as hereinafter described.

In order to avoid excessive lateral vibration or swinging movement of the type-wheel, and thereby increase the compactness of the mechanism to provide for the prompt operation of the different members thereof from the key-levers, I have found it expedient to arrange the type-faces having the characters belonging to one set or one case or field in a double row, and in practice the small letters or "lower-case" characters are arranged in the uppermost field or the two upper transverse rows or series of type-faces carried by the yielding tongues. The capitals or upper-case letters or characters are arranged in an intermediate series or field comprising the third and fourth rows of type-faces on said tongues, while the third or lowermost group or field of two transverse series of type-faces constitutes the numerals, punctuation-marks, and other auxiliary characters.

Figure 17:
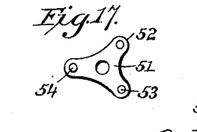
Fig. 17 is a side view, and Fig. 18 a plan view, of the trip.
Figure 18:
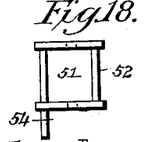
Figures 22, 23, 24:
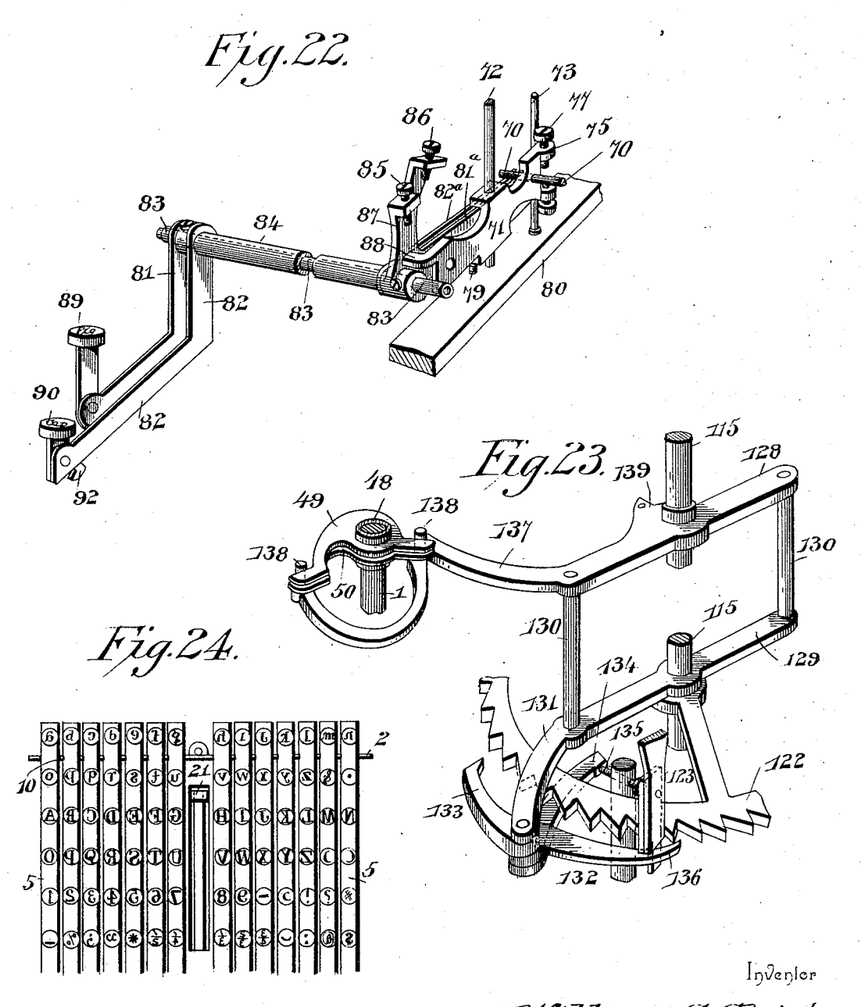
Fig. 22 is a detail view of the shift-keys and connections.
Fig. 23 is a similar view of the escapement devices.
Fig. 24 is a detail front view of a portion of the type-wheel to show the preferred arrangement of characters.

Inasmuch as two rows or horizontal series of type-faces are required for each group or set of characters, as above indicated, it will be understood that means must be provided for adjusting the type-wheel vertically or longitudinally to bring that row or series of characters in which the character belonging to a given key is located into the printing-plane in addition to moving the type-wheel laterally to bring the proper tongue into the printing-plane, and in order to facilitate the operation of the mechanism I have devised means for securing the automatic longitudinal adjustment of the type-wheel from the key-levers, whereby when a given key-lever is depressed the type-wheel is adjusted both longitudinally and laterally to bring the type corresponding with the letter on said key into the proper position for making an impression. In the construction illustrated in the drawings these means include a pivotal or tilting trip 51, (shown in detail in Figs. 17 and 18,) consisting of an open cage having spaced pins 52 and 53 and a stud 54, which is arranged in the shoe 11, the lower or adjustable plate 13 of said shoe being adapted to be arranged in such a position with relation to the upper plate 12 as to prevent lost motion of the trip. As this trip is rocked it communicates to the shoe, and hence to the type-wheel, a vertical movement equal to the vertical interval between the contiguous transverse series or rows of type-faces constituting one set or group—as, for instance, the interval between the first and second, the third and fourth, and the fifth and sixth rows of type-faces, according to the vertical position of the type-wheel.

55 represents a rocking frame consisting of a shaft 56, having a depending arm 57, which is connected by means of a rod 58 with one arm of a bell-crank lever 59, said lever having a trip-arm 60, which is arranged at its free end in operative relation with the pins 52 and 53 of the trip. When the rocking frame 55 is moved to cause the arm 57 to swing in the direction indicated by the arrow in Fig. 1, the free end of the trip-arm 60 will be depressed into engagement with the pin 53, and hence cause the elevation of the pin 54 and the consequent elevation of the type-wheel to bring the second row of type-faces into the printing-plane, and when said rocking frame is moved in the opposite direction the free end of the trip-arm will be elevated to engage the pin 52 and tilt the trip in the opposite direction, and thus depress the type-wheel.

In order to insure the fixed position of the type-wheel during the operation of producing an impression, I preferably so construct the trip and trip-arm that the latter locks the former in the position to which it has adjusted it, and hence after the trip-arm is moved in engagement with one of the pins 52 or 53 sufficiently to throw the trip to one of its adjusted positions the extremity of said arm passes the pin 52 or 53 with which it has been in contact in moving the trip and assumes a position with its extremity which is squared or abrupt in front of said pin, as shown clearly in Fig. 1. This disposes the other pin of the trip in the path of the arm. The trip retains this locked position until motion is again communicated to the trip-arm to release one pin and engage the other to move the trip to the other position. For instance, with the parts in the positions shown in Fig. 1 the trip is locked with the type-wheel in its depressed position, whereby the uppermost or first row of type-faces is in the printing-plane, but if it is desired to impress a character corresponding with a type-face arranged in the second row the trip-arm is depressed at its free end by the operation of a key-lever corresponding with a character in the second row to release the upper pin 52 and engage the lower pin 53, and thereby rock the trip to cause the elevation of the type-wheel and lock the trip in said position. Either row or series of a group or field may be at the printing-point when its case or field is in the printing position, and the lower-case characters, comprised in the uppermost field, are normally in printing position, being so held by gravity.

In order to secure the automatic adjustment of this trip, each key-lever is provided with a shoulder arranged in the path of a trip-rod carried by the rocking frame 55, two of said trip-rods (shown at 61 and 62 and carried, respectively, by oppositely-extending arms 63 and 64) being employed. These trip-rods are arranged, respectively, in the paths of shoulders 65 and 66 on the key-levers, each key-lever having one or the other, according to the character which it bears and the row or series of type-faces in which the corresponding type is located. For instance, if a key-lever carries a character corresponding with a type in the upper series or row of the type-wheel said key-lever is provided with the shoulder 66, whereby when said key-lever is depressed the shoulder 66 engages the trip-rod 62 and turns the rocking frame 55 in the opposite direction to that indicated by the arrow in Fig. 1, and thereby elevates the free end of the trip-arm 60 and depresses the shoe 11 to the positions illustrated in said Fig. 1. If, on the other hand, a key-lever carries a character corresponding with a type in the second series or row, said key-lever is provided with a shoulder 65, arranged to engage the trip-rod 61, and thus tilt the frame 55 in the direction indicated by said arrow in Fig. 1 to depress the free end of the trip-arm 60, and thereby elevate the type-wheel.

It will be seen that the trip-rods 61 and 62 are arranged at different distances from the axis of the frame 55, the latter being located at a greater interval than the former, but it will also be seen that the trip-rod 61 is located between the axis of said rocking frame and the fulcrums of the key-levers, whereas the trip-rod 62 is located in rear of or beyond the axis of said frame. Hence in order to give a uniform throw to the frame 55 it is necessary to proportion the distance of the trip-rods from the axis of motion to suit the distance of the shoulders 65 and 66 from the fulcrum of the lever. In this connection it should be noted that in order to cause all of the cams $26^a$ to coöperate with the trip-rod 28 irrespective of the length of the key-lever (said key-levers being of different lengths in order to arrange them compactly upon the keyboard) and secure a uniform depression or throw of the key-levers the long and short key-levers are fulcrumed, respectively, by means of horizontal spindles 67 and 68, whereby the proportionate lengths of the front and rear arms of all of the levers are uniform, the long levers being recessed or cut away, as shown at 69, to pass under the spindle of the short levers and allow free movement.

Having described the automatic means for adjusting the type-wheel longitudinally to bring the different series or rows belonging to a given set or group into the printing-plane, said means being actuated by and under the control of the key-levers, it will be understood that in order to bring different sets or groups of characters in a position for automatic operation it is necessary to vary the vertical position of the fulcrum 70 of the tilting trip 51, and hence in this connection I employ a slide 71, consisting of a block which is mounted for vertical movement upon a fixed guide-bar 72, said trip being fulcrumed upon the slide contiguous to that end which is adjacent to the shoe 11, an auxiliary fixed guide-rod 73 being arranged near the extremity of the slide to prevent lateral swinging movement or displacement of the slide, which is provided with a notch 74 to engage said rod. The slide is provided with upper and lower limiting-jaws 75 and 76, arranged, respectively, above and below the plane of the shoe 11, and mounted, respectively, in said jaws are the upper and lower limiting-screws 77 and 78, which form adjustable stops to regulate the vertical throw of the shoe to accurately correspond with the interval between contiguous rows of type-faces on the type-wheel, and thus limit the throw of the tilting trip 51. The downward movement of the slide 71 is also limited by an adjustable stop, consisting of a screw 79, which is adapted to engage a fixed part, as 80, of the frame.

Various means may be employed for adjusting this slide to bring different sets or groups of type-faces into operative position contiguous to the printing-plane, and in the construction illustrated said means consist of case-key levers 81 and 82, fulcrumed coaxially and preferably provided with concentric spindles, the spindle 83 of the lever 81 being arranged within the hollow spindle 84 of the lever 82. These case-key levers are provided, respectively, with arms 81$^a$ and 82$^a$, which are arranged in operative relation with the slide to impart vertical movement thereto and are preferably arranged at their free ends under the extended spindle or pivot 70 of the trip. These levers are mounted to have throws of different extent, whereby the slide is elevated more or less, according to the case-key lever which is operated. In order to compensate for this difference in throw, the levers are preferably of different lengths, that lever, 82, which is designed to elevate the type-wheel to bring the second set or group or field of type-faces (having the "upper-case" characters) into operative position being longer than the lever 81, which is designed to bring the third set or group or field of type-faces bearing the auxiliary characters, as numerals and punctuation-marks, into operative position.

It is desirable, furthermore, to employ means for regulating the vertical throw of the slide 71 in order to secure accurate alinement of the printing-characters, and the means which I have shown for accomplishing this object consist of adjustable stops 85 and 86, carried by an upstanding arm 87 of the shorter case-key lever 81, said arm being arranged in an approximately radial position with relation to the concentric spindles of the case-key levers. When the case-key lever 82 is depressed, the slide is elevated until a lug 88 thereon comes in contact with the extremity of the adjustable stop 85, the case-key lever 81 meanwhile remaining at rest, and when the case-key lever 81 is depressed the slide is elevated until said lug comes in contact with the adjustable stop 86, the operation of depressing said case-key lever 81 serving to swing the arm 87 forwardly and thus remove the stop 85 from the path of the lug 88 and arrange the more elevated stop 86 in the path thereof. In order to provide for locking either case-key lever in its adjusted position, whereby characters belonging to either group may be impressed without manually holding said lever, I pivot the case-keys 89 and 90, respectively, to their levers 81 and 82 and provide each with a locking tongue or hook 91 and 92 to engage fixed pins 93 and 94, as clearly shown in Fig. 1.

The form of platen which I preferably employ is shown in Fig. 1 and consists of a roller 95, the path of the paper traversing the roller being indicated at 96 and being held in place by the usual pressure-roll 97, and between the surface of the platen and the type-wheel is arranged an inking device, such as a ribbon 98, whereby the character constituting the type-face is impressed through the ribbon upon the surface of the paper; but it is necessary in order to secure the impression of the desired type-face and the exclusion of all others to employ a printing-hammer 99 or its equivalent to strike the rear side of a tongue carrying the type-face to form the impression and directly in line with the desired type. The means which I have shown for communicating motion to this hammer, which is pivoted at 100, include a crank-arm 101, which is connected by a rod 102 to an arm 103 of a rock-shaft 104. This rock-shaft is adapted to be turned in the direction indicated by the arrow in Fig. 1 in order to swing the hammer toward the platen, and in order to turn the rock-shaft in this direction I employ a cam-faced operating-arm 105, carried by the rock-shaft and arranged in the path of a lateral stud 106 on the driving-lever 42. Hence when a key-lever is depressed the rocking frame 27 is first operated by means of the cam-face 26$^a$ to depress the gage-bar 21 into the plane of the step of the fixed gage which corresponds with the position of the tongue having the type corresponding with the character on the key, and at the same time the rocking frame 55, if arranged in the wrong position to suit the character which is carried by the key-lever, is actuated to move the trip 51, and thereby arrange the proper row or series of type-faces in the printing plane. The depression of the key-lever also communicates motion through the arm 43 to the driving-lever 42 upon the same side of the center of the machine as that occupied by the key-lever which is depressed, and the forward movement of the head of this driving-lever first releases the type-wheel, and then, by the engagement of the lug 46 with the contiguous arm 47, imparts lateral swinging movement to the operating-gage. When the proper step or shoulder of the operating-gage comes in contact with the gage-bar, motion is communicated through the operating-gage and said gage-bar to the type-wheel, and the latter is adjusted laterally to bring the proper type-bearing tongue into the printing-plane. Just before the lateral movement of the type-wheel is checked by the engagement of the gage-bar with the step or shoulder of the fixed gage (in the horizontal plane of which said gage-bar has been adjusted by means of the cam 26$^a$, tilting frame 27, and rod 33) the stud 106 engages the cam-faced arm 105 of the rock-shaft 104 and by swinging said rock-shaft in the direction indicated by the contiguous arrow in Fig. 1 elevates the free end of the crank-arm 101 and forces the hammer toward the platen to strike the tongue which is in the printing-plane in line with the type which is in position for forming an impression. At the moment of the operation of the hammer the tilting rod 28 of the frame 27 is engaged in the parallel-sided guide or seat 29 of the key-lever, whereby the gage-bar is held firmly in the proper position, and at the same time the trip 51 is locked by the trip-arm 60 in the position to which it has been adjusted by the tilting frame 55 and bell-crank lever 59.

In order to prevent vibration or rattling of the hammer when in its repressed or normal position, I arrange the pivotal points of the link 102 in direct alinement with the rock-shaft 104, and therefore when the parts are in the positions illustrated in Fig. 1 the rock-shaft cannot be turned by applying pressure to the hammer, thus preventing vibration. The above-described lock can be released only by imparting rotary movement to the rock-shaft.

Figure 3:
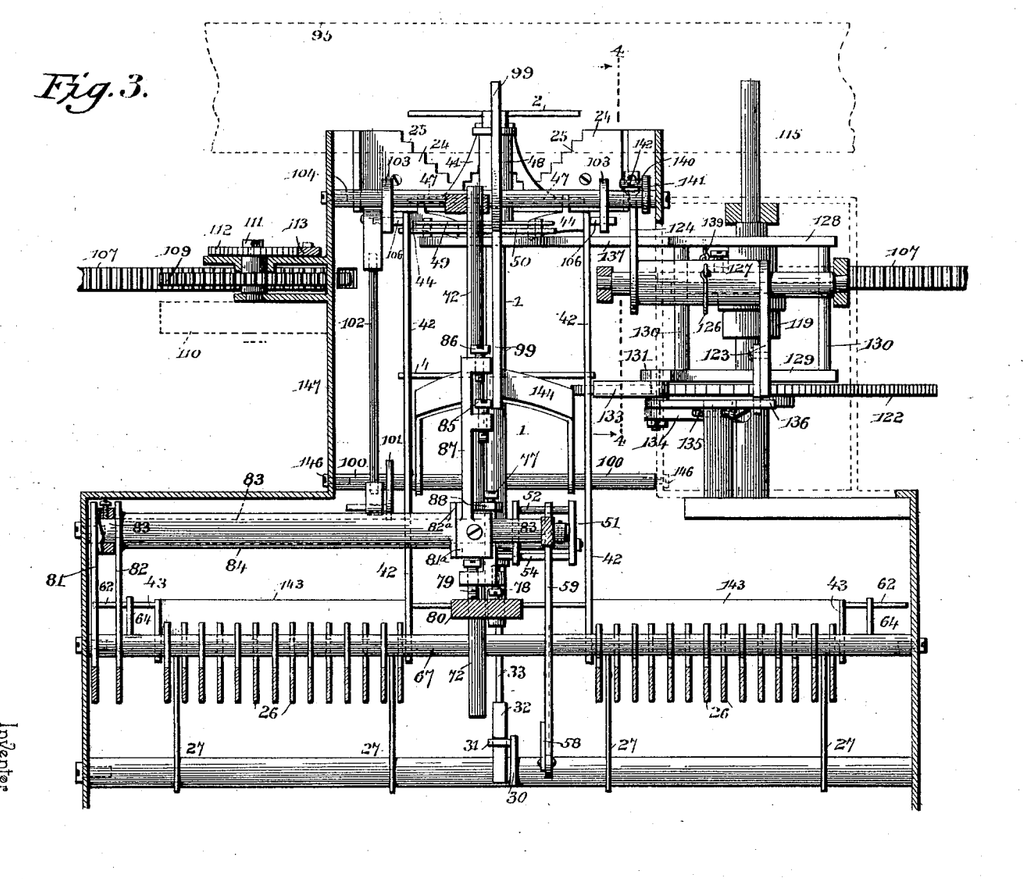
Fig. 3 is a vertical section on the line 3 3 of Fig. 1.
Figure 5:
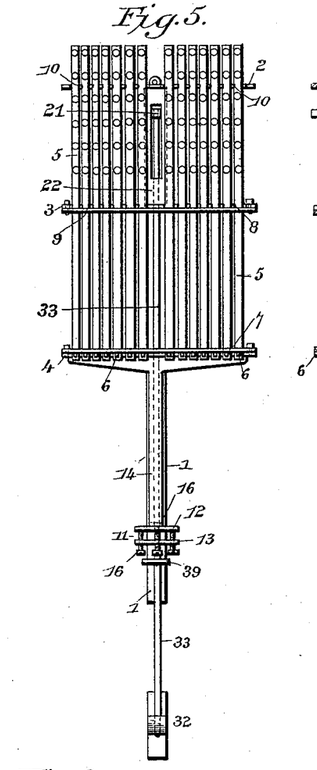
Fig. 5 is a front view in detail of the type-wheel and immediate connections.

The feed mechanism or letter and word spacing devices, which I have illustrated in the drawings, for imparting motion parallel with the lines of writing to the platen are constructed as follows:

107 represents a rack-bar capable of movement parallel with the lines of writing and adapted to be suitably connected to the means for supporting the platen, such as a carriage, (indicated in dotted lines at 108,) such carriage, however, being of any approved construction and forming no part of my invention, and 109 represents a gear meshing with said rack and adapted to be driven by a feed-spring 110, which is indicated in Fig. 3, the arbor 111 of said spring and gear being held at the desired adjustment to insure the proper tension of the spring by means of ratchet mechanism including a ratchet-wheel 112 and pawl 113. This rack-bar also meshes with the pinion 114, which is loosely mounted upon a feed-shaft 115, and the pinion carries a ratchet-wheel 116, engaged by a dog 117, carried by an arm 118, which is fixed, by means of a collar 119, to said feed-shaft, whereby the pinion may be turned freely in one direction by linear movement imparted to the rack-bar to move the platen against the tension of the actuating-spring 110, or in a direction opposite to the forward or operative movement of said parts, without communicating motion to the feed-shaft; but movement of the rack-bar 107 and pinion 114 in the opposite direction, or forward, is prevented by said dog 117 and ratchet 116 without communicating rotary motion to the feed-shaft. The dog 117 is normally held in engagement with the ratchet-wheel by means of a spring 120, which bears upon the arm 121 of the pawl.

The rotary movement of the feed-shaft is controlled by means of a ratchet-toothed or feed wheel 122, which is fixed to the feed-shaft and is normally engaged by a stop-pawl 123, and this stop-pawl, which is fulcrumed at an intermediate point to form an upwardly-extending arm 124, is held in either its engaged or disengaged position by means of a spring 125, which is connected, by means of a link 126, with a forwardly-extending finger 127, carried by the hub of the pawl.

Mounted coaxially with and preferably upon the feed-shaft 115 is a swinging feed-frame, having upper and lower bars 128 and 129, connected by uprights 130, the lower bar 129 of said frame being extended to form an arm 131, which carries an intermediately-pivoted operating-pawl 132. The head 133 of this operating-pawl is arranged in operative relation with the teeth of the feed-wheel 122 and in the plane thereof and is adapted to be engaged therewith when a trip-arm 134, which extends inwardly from the operating-pawl, is out of engagement with an adjustable stop 135, (clearly shown in Fig. 2,) and the tail 136 of the operating-pawl extends in front of and is normally arranged in contact with the stop-pawl 123, whereby when the trip 134 of the operating-pawl is in engagement with the stop 135 the tail 136 of the operating-pawl holds the stop-pawl in engagement with the teeth of the feed-wheel and thereby locks said feed-wheel against rotary movement in the direction of the arrow shown in Fig. 2 or in the direction necessary to feed the platen forwardly in the direction of the line of writing.

Figures 2, 20, 21:
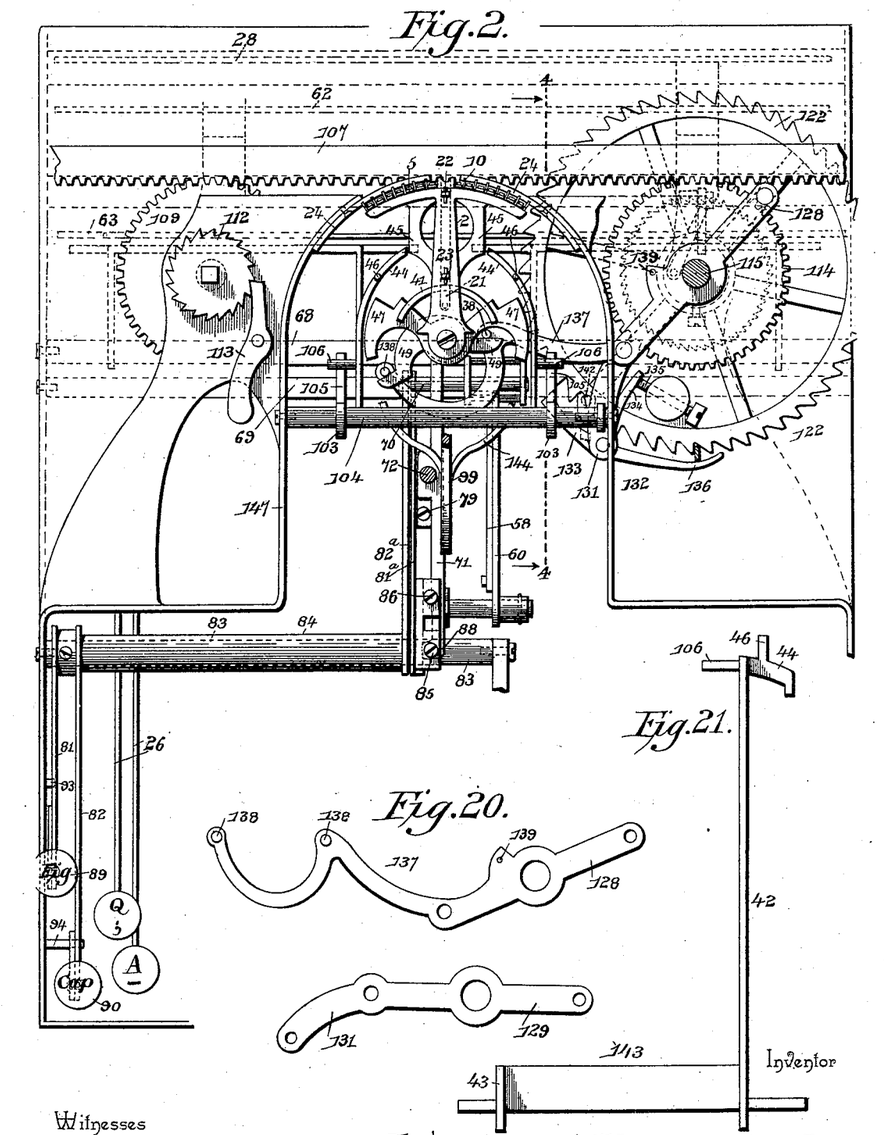
Fig. 2 is a plan view of the same, partly in section, on the line 2 2 of Fig. 1.
Fig. 20 shows detail views of the upper and lower bars of the feed-frame.
Fig. 21 is a detail view of one of the driving-levers detached.

The upper bar 128 of the feed-frame is extended to form an arm 137, carrying spaced pins 138, which respectively engage the arms of the spider 49, as clearly shown in Fig. 2, the portion of said arm between the pins being bowed to avoid interference with the contiguous portions of the mechanism, said pins being designed and adapted to engage also the secondary spider 50, which is fixed to the spindle of the type-wheel, and inasmuch as the actuating-spring 125 of the stop-pawl is connected to the feed-frame, as shown at 139, it is obvious that both the type-wheel and the operating-gage will be held in their central positions when at rest by the pressure of the pins 138 upon the extremities of the oppositely-extending arms of the spiders.

In operation when the stud 46 of a driving-lever engages the corresponding arm 47 of the operating-gage and communicates rotary motion thereto the spider 49 is turned in the same direction with the operating-gage and thereby swings the feed-frame in a direction opposite to that indicated by the arrow on the feed-wheel to arrange the nose of the feed-pawl opposite that tooth of the feed-wheel with which it is to engage. When the hammer 99, under the control of the driving-lever 42, has been thrown forward to a position which brings its impact extremity almost in contact with the type-bearing tongue arranged in the plane thereof, a trip-pin 140, carried by an arm 141 on the rock-shaft 104, strikes an adjustable stop 142 on the upper extremity of the arm 124 of the stop-pawl, and by swinging said arm in the direction indicated by the arrow in Fig. 4 disengages its lower arm from the feed-wheel 122. This outward movement of the stop-pawl causes a corresponding movement of the tail 136 of the operating-pawl, and hence throws the nose of the operating-pawl into engagement with the feed-wheel. Thus when the hammer strikes the type-bearing tongue to make an impression the feed-wheel is held in place by the nose of the operating-pawl, and when the key-lever is released by the operator, thereby relieving the arm 47 of the pressure of the driving-lever, the feed-wheel 122 is free to rotate in the direction of the arrow in Fig. 2 under the tension of the actuating or feed spring 110, thereby carrying the feed-frame in the same direction until the trip-arm 134 is engaged by the stop 135 and throws the tail of the feed-pawl toward the feed-wheel to engage the stop-pawl with the teeth thereof. This movement of the feed-frame with the feed-wheel causes the return of the operating-gage and type-wheel to their normal or central positions, where they are held by the tension of the spring 125.

I have deemed it unnecessary to show or describe any specific means for imparting rotary motion to the roller 95 or for feeding the ribbon, inasmuch as any of the ordinary forms of line-spacing and ribbon-feeding mechanisms may be employed in this connection.

The driving-levers are preferably provided with hubs 143, at opposite ends of which the arms 43 and the body portions of said levers are arranged, as clearly shown in Fig. 3, and the hammer is preferably bifurcated at its lower end, as shown at 144, and is provided with a spindle 100, held in place by means of journal-screws 146 mounted in the frame, a portion of which is shown at 147. Only the general outlines and a portion of the frame have been illustrated, inasmuch as this feature may be varied to suit the preference of the manufacturer, and has no material bearing upon the invention.

From the above description it will be seen that the type-wheel consists of two sections, a guiding-section comprising a spindle and a terminal and an intermediate arm, the arms being provided with cross-heads having seats, and a movable type-bearing section comprising an arm mounted to slide vertically upon the spindle toward and from the planes of the said terminal and intermediate arms, and carrying yielding type-bearing tongues, which fit to slide in the seats of the arms forming the first-named section. The arms which are attached to and carried by the spindle are arranged in fixed relative positions, and the hammer operates at a given distance above the plane of the upper or terminal arm, whereby the portion of the type-bearing arm which projects above the uppermost guiding-arm is proportionate to the vertical adjustment of the movable section of the wheel, and the interval between the plane of said uppermost guide-arm and the type to be impressed is uniform. In other words, the uppermost guide is located at a fixed distance from the printing-plane, whereby the resistance offered by a tongue to the hammer is uniform in all positions of the vertically-adjustable member of the wheel.

The greater proportion of the force necessary to depress the keys is expended in moving the driving-lever 42, and hence in proportioning the long and short arms of the key-levers the short arms are measured from the spindles or rods upon which the key-levers are mounted rearwardly to the points where said levers come in contact with the short arm 43 of the driving-lever 42. With this arrangement and proportionate length of arms a uniform force or pressure is required to operate the key-levers, and a uniform depression of the keys accomplishes the desired result.

Various changes in the form, proportion, and the minor details of construction may be resorted to without departing from the spirit or sacrificing any of the advantages of this invention.

Having described my invention, what I claim is—

1. A type-writing machine having a type-wheel including longitudinally-movable radially-yielding type-bearing tongues, and permanent guides through which the tongues extend to slide, and operating devices, substantially as specified.

2. A type-writing machine having a type-wheel including terminal and intermediate segmental cross-heads provided with alined guides or seats, and an axially-movable cross-head carrying type-bearing tongues which extend through said guides or seats, and operating devices, substantially as specified.

3. A type-writing machine having a type-wheel including a spindle, radial arms carried by the spindle and terminating in segmental cross-heads having seats, one of said arms being axially movable, yielding type-bearing tongues secured to said movable arm and fitting to slide in the seats of the remaining arms, the seats on the arm contiguous to the free ends of the tongues being open, and operating devices, substantially as specified.

4. A type-writing machine having a type-wheel comprising a guiding-section and a type-bearing section, the former including a spindle and arms arranged in fixed relative positions and provided with alined guiding-seats consisting of spaced pins, and the latter comprising an arm mounted to slide upon the spindle, and yielding type-bearing tongues permanently secured at one end to the movable arm by means of pins engaging perforations in the tongues and a securing-strip for holding the tongues in engagement with the pins, said tongues fitting in the seats of the arms forming the first-named section, and operating devices, substantially as specified.

5. A type-writing machine having a type-wheel comprising a guiding-section provided with alined seats arranged in fixed relative positions, and a type-bearing section being mounted for movement parallel with lines connecting said seats and having yielding type-bearing tongues fitted to slide in the seats, and operating devices, substantially as specified.

6. A type-writing machine having a type-wheel capable of swinging movement in either direction from an intermediate point of rest and having type-faces arranged in a transverse series at different distances from an intermediate point of the wheel, fixed and movable gages having relatively-inverted convergent series of steps or shoulders, a gage-bar mounted upon the type-wheel for movement parallel with the axis thereof and adapted to be arranged in the planes of different steps or shoulders of said gages to limit the lateral movement of the wheel, and operating devices for turning the movable gage, substantially as specified.

7. A type-writing machine having a type-wheel mounted for movement in either direction from an intermediate point of rest and having type-faces arranged at intervals upon opposite sides of a point which is normally arranged in the printing-plane, a fixed gage having convergent series of steps or shoulders, a movable gage mounted for movement parallel with the type-wheel and having series of steps or shoulders converging in the opposite direction to those of the fixed gage, a gage-bar mounted upon the type-wheel for movement parallel with the axis thereof and adapted to be arranged in the planes of corresponding steps or shoulders of the fixed and movable gages, means for adjusting said gage-bar, and operating devices for communicating motion in either direction to the movable gage, substantially as specified.

8. A type-writing machine having a type-wheel mounted for movement in either direction from an intermediate point of rest and having type-faces arranged at intervals upon opposite sides of a point which is normally arranged in the printing-plane, coöperating fixed and movable gages having steps or shoulders arranged in inclined series respectively converging and diverging in a common direction, the movable gage being mounted concentrically with the type-wheel, operating devices for imparting motion to the movable gage, a gage-bar mounted upon the type-wheel for movement parallel with the axis thereof and adapted to be arranged in the planes of corresponding steps or shoulders of said gages, and means for operating the gage-bar, substantially as specified.

9. A type-writing machine having a type-wheel mounted for movement in either direction from an intermediate point of rest and having type-faces arranged at intervals upon opposite sides of a point which is normally arranged in the printing-plane, fixed and movable gages having steps or shoulders arranged in inclined series respectively converging and diverging in a common direction, the movable gage being mounted concentrically with the type-wheel, operating devices including key-levers for communicating motion to the movable gage, a gage-bar mounted upon the type-wheel for movement parallel with the axis thereof and adapted to be arranged in the planes of corresponding steps or shoulders of the gages, and connections between said gage-bar and the key-levers, substantially as specified.

10. A type-writing machine having a type-wheel, fixed and movable gages having steps or shoulders arranged in series respectively converging and diverging in a common direction, a gage-bar mounted for movement parallel with the axis of the type-wheel and adapted to be arranged in the planes of corresponding steps of the gages, a rocking frame operatively connected with the gage-bar, key-levers respectively carrying cams of different pitch to engage a trip-rod on the rocking frame, and means connected with the key-levers for imparting swinging movement to the movable gage, substantially as specified.

11. A type-writing machine having a type-wheel, fixed and movable gages having steps or shoulders arranged in series respectively converging and diverging in a common direction, a gage-bar mounted for movement parallel with the axis of the type-wheel and adapted to be arranged in the planes of corresponding steps of the gages, a yielding rocking frame operatively connected with the gage-bar and having a transverse trip-rod, key-levers provided with inclined cam-faces and communicating parallel-sided seats respectively adapted to engage and receive said trip-rod, the cam-faces of different levers varying in pitch, and operating connections between the key-levers and the movable gage, substantially as specified.

12. A type-writing machine having a type-wheel, fixed and movable gages having steps or shoulders arranged in series respectively converging and diverging in a common direction, a gage-bar mounted for movement parallel with the axis of the type-wheel and adapted to be arranged in the planes of corresponding steps of the gages, a rocking frame operatively connected with the gage-bar and having a single transverse trip-rod, key-levers having their keys arranged in different transverse series and provided at their rear ends with transversely-alined cam-faces to engage said trip-rod, the key-levers being fulcrumed at intermediate points and at different distances from said cam-faces whereby the lengths of the front and rear arms of all of the levers are of a given uniform ratio, and operating connections between the key-levers and the movable gage, substantially as specified.

13. A type-writing machine having a type-wheel mounted for longitudinal and lateral movement and having parallel-spaced rows or series of type-faces either of which is adapted to be arranged in the printing-plane, a rocking trip operatively connected with the type-wheel and capable of a plurality of positions, a pivotal trip-arm arranged at one end between spaced points on the trip, key-levers, and operating connections including a rocking frame between the key-levers and the trip whereby the trip is adjusted by the key-levers to correspond with the character carried by each key-lever, substantially as specified.

14. A type-writing machine having a type-wheel mounted for longitudinal and lateral movement and having parallel-spaced rows or series of type-faces either of which is adapted to be arranged in the printing-plane, a rocking trip operatively connected with the type-wheel and capable of a plurality of positions, said trip having spaced pins, a pivotal trip-arm arranged at its free end to swing between and engage said pins alternately, key-levers, and operating connections between the key-levers and said trip-arm, substantially as specified.

15. A type-writing machine having a type-wheel mounted for longitudinal and lateral movement and having parallel-spaced rows or series of type-faces either of which is adapted to be arranged in the printing-plane, a rocking trip operatively connected with the type-wheel and having spaced pins, a pivotal trip-arm arranged with its free end in operative relation with said pins and adapted to engage and move the latter alternately out of its path to occupy a position with its extremity in the path thereof and thereby lock the trip in its adjusted positions, key-levers, and operating connections between the key-levers and the trip-arm, substantially as specified.

16. A type-writing machine having a type-wheel mounted for longitudinal and lateral movement and having parallel-spaced rows or series of type-faces either of which is adapted to be arranged in the printing-plane, a rocking trip operatively connected with the type-wheel, a trip-arm arranged at its free end in operative relation with said trip, key-levers, a rocking frame provided upon opposite sides of the plane of its axis with trip-rods arranged in the paths of shoulders carried respectively by the key-levers, whereby the frame is tilted in opposite directions by the operation of different key-levers, and connections between the rocking frame and the trip-arm, substantially as specified.

17. In a type-writing machine, the combination with a type-wheel and key-levers, of a driving-lever having one arm arranged in the paths of the key-levers, and a swinging arm operatively connected with the type-wheel to communicate rotary motion thereto and arranged in the path of a stud on the driving-lever, said driving-lever being extended to occupy, when at rest, a position in the path of the type-wheel to lock the latter against movement, and the movement of the driving-lever to actuate said swinging arm serving to release the type-wheel, substantially as specified.

18. In a type-writing machine, the combination with a type-wheel adapted to normally occupy an intermediate point of rest, and key-levers, of swinging arms operatively connected with the type-wheel and adapted to communicate swinging movement in opposite directions thereto, driving-levers each having an arm arranged in the paths of the key-levers, and provided with studs to engage said swinging arms to communicate motion to the type-wheel, each driving-lever being extended to occupy, when at rest, a position at one side and in the path of the type-wheel to lock the latter against swinging movement, and resilient means for returning the type-wheel to its normal position, the movement of one of the type-levers to actuate the corresponding swinging arm serving to release the type-wheel for movement in the direction in which it is actuated by the corresponding swinging arm, substantially as specified.

19. A type-writing machine having a type-wheel provided with yielding type-bearing tongues, a hammer adapted to engage a tongue in the printing-plane, a driving-lever and means for communicating swinging movement thereto, a rock-shaft having a crank-arm connected by means of a link with the crank-arm on the hammer, the pivotal points of said link being adapted to be arranged in alinement with the axis of the rock-shaft to lock the hammer against vibration in its retracted position, and a cam-faced arm on the rock-shaft arranged in the path of a lateral pin on the driving-lever, substantially as specified.

20. A type-writing machine having a type-wheel yieldingly held at an intermediate point of rest, means for communicating rotary motion to the type-wheel including arms 47 mounted concentrically with the type-wheel, fixed and movable gages having series of steps or shoulders arranged respectively to converge and diverge in a common direction, the movable gage being carried by said arms, a gage-bar mounted for movement parallel with the axis of the type-wheel and adapted to be arranged in the planes of corresponding steps or shoulders of the gages, means for adjusting the gage-bar, and operating devices including driving-levers normally arranged in engagement with the type-wheel to lock it in its position of rest, said arms being arranged in the paths of projections on the driving-levers and adapted to be turned to communicate motion to the movable gage, substantially as specified.

21. A type-writing machine having a longitudinally-movable type-wheel having type-faces arranged in spaced transverse series, a slide mounted for movement parallel with the type-wheel and operatively connected therewith, case-key levers operatively connected with the slide, and stops carried by one of the case-key levers at different distances from its fulcrum and arranged in different radial planes, one stop being normally in the path of said slide and the other being moved thereinto by the lever by which it is carried, substantially as specified.

22. A type-writing machine having a type-wheel mounted for longitudinal movement and having type-faces arranged in different transverse rows or series, a slide mounted for movement parallel with the type-wheel and operatively connected therewith, case-key levers operatively connected with the slide and adapted to move the same through different distances, one of the case-key levers being provided with an arm extending radially from its fulcrum, and adjustable stops carried by said arm in different radial planes, one stop being normally in the path of said slide and the other being moved thereinto by the operation of the lever by which it is carried, substantially as specified.

23. A type-writing machine having a type-wheel provided with different groups or sets of type-faces, each group or set comprising a plurality of transverse spaced series or rows, a slide mounted for movement parallel with the axis of the type-wheel, a rocking trip mounted upon the slide and operatively connected with the type-wheel, key-levers, operating connections between the key-levers and said trip and including means for locking the trip in either of its adjusted positions, case-key levers operatively connected with the slide, and adjustable stops carried by one of the case-key levers to limit the movement of the slide, substantially as specified.

24. A type-writing machine having a type-wheel adapted to normally occupy an intermediate position of rest, printing mechanism including means for impressing the type-faces, letter-spacing mechanism including an actuating or feed spring, and operating connections between said spring and the type-wheel whereby the latter is returned after each operation to said position of rest, substantially as specified.

25. A type-writing machine having a type-wheel, printing mechanism including means for impressing the type-faces, a spider connected to and mounted concentrically with the type-wheel, letter-spacing mechanism including an actuating or feed spring and a pivotal frame operatively connected with the spring and provided with pins arranged in operative relation with the arms of said spider, whereby after each deflection the type-wheel is returned to its normal position by the pressure of said frame, substantially as specified.

26. A type-writing machine having a type-wheel and means for moving it in either direction from a point of rest, printing mechanism including means for impressing the type-faces, a spider operatively connected with the type-wheel, a pivotal frame having an arm provided with pins arranged normally in contact with opposite arms of the spider, and yielding means for holding said frame in its normal position, whereby the type-wheel is returned after each deflection in either direction to a normal position of rest, substantially as specified.

27. A type-writing machine having a type-wheel, printing mechanism including means for impressing the type-faces, a spider operatively connected with the type-wheel, letter-spacing mechanism including a feed-wheel, operating and stop pawls arranged in operative relation with said wheel, and a feed-frame carrying the operating-pawl and operatively connected with said spider, whereby the feed mechanism is controlled by the operation of the type-wheel, substantially as specified.

28. A type-writing machine having a type-wheel capable of a variable lateral movement to bring different type-faces into the printing-plane, operating mechanism including means for impressing the type-faces and a spider mounted concentrically with the type-wheel and having a uniform lateral movement, and feed mechanism including a feed-wheel exposed to a constant rotating force applied in a uniform direction, operating and stop pawls in operative relation with the feed-wheel, and a feed-frame carrying the operating-pawl and provided with pins arranged respectively in contact with the arms of said spider, substantially as specified.

29. A type-writing machine having a feed-wheel and means for communicating rotary motion in a uniform direction thereto, operating and stop pawls arranged in operative relation with the feed-wheel, the operating-pawl being adapted to move in a path parallel with the periphery of the feed-wheel and having a tail arranged in permanent contact with the stop-pawl, a swinging arm carrying the operating-pawl, operating devices for advancing said arm when the pawl is in engagement with the feed-wheel, means for disengaging the stop-pawl from the feed-wheel and thereby throwing the operating-pawl into temporary engagement therewith, and a stop arranged in the path of a trip-arm on the operating-pawl to return the parts to their normal positions, substantially as specified.

30. A type-writing machine having a type-wheel, a spider operatively connected with the type-wheel, printing mechanism for impressing the type-faces including a rock-shaft, and feed mechanism including a feed-wheel, and operating-pawls arranged in operative relation with the feed-wheel, a crank-arm on said rock-shaft adapted to engage the stop-pawl to disengage the same from the feed-wheel, the operating-pawl being provided with a tail arranged in contact with the outer side of the stop-pawl, a feed-frame having an arm provided with pins arranged in operative relation with the spider, said feed-frame carrying an operating-pawl, and a stop arranged in the path of a trip-arm on the operating-pawl, substantially as specified.

31. A type-writing machine having a type-wheel, printing mechanism for impressing the type-faces including a rock-shaft, and feed mechanism including a feed-wheel, and means for imparting rotary motion in a uniform direction thereto, a pivotal stop-pawl arranged in operative relation with the feed-wheel, a crank-arm carried by said rock-shaft for engaging an arm of the stop-pawl, a holding-spring connected with a finger on the stop-pawl and adapted to hold the latter in either its engaged or disengaged position, a feed-frame operatively connected with the type-wheel and having the other end of said holding-spring attached thereto, an operating-pawl mounted upon the feed-frame and having a tail arranged in operative relation with the stop-pawl, whereby when the latter is disengaged the former is engaged with the feed-wheel, and a trip-arm on the operative pawl adapted to engage a stop to return the stop-pawl into engagement with the feed-wheel, substantially as specified.

In testimony that I claim the foregoing as my own I have hereto affixed my signature in the presence of two witnesses.

WILLIAM S. SHIRK.

Witnesses:
M. M. DUNLAP,
EARL REEVE.